Dec. 25, 1962

W. GREGG 3,070,386

TRAIN OF TRAILERS FOR CARRYING LOAD EXTENDING BETWEEN THE TRAILERS

Filed April 3, 1958

INVENTOR.
WILLIAM GREGG
BY Woodling & Krost
ATTORNEYS

Dec. 25, 1962 W. GREGG 3,070,386
TRAIN OF TRAILERS FOR CARRYING LOAD
EXTENDING BETWEEN THE TRAILERS
Filed April 3, 1958 2 Sheets-Sheet 2

INVENTOR.
WILLIAM GREGG
BY
Woodling & Krost
ATTORNEYS

United States Patent Office 3,070,386
Patented Dec. 25, 1962

3,070,386
TRAIN OF TRAILERS FOR CARRYING LOAD EXTENDING BETWEEN THE TRAILERS
William Gregg, Cleveland, Ohio, assignor to The W. H. Fay Company, a corporation of Ohio
Filed Apr. 3, 1958, Ser. No. 726,262
2 Claims. (Cl. 280—404)

The invention relates in general to road vehicles and more particularly to an auxiliary or secondary trailer for use with a main or primary motor vehicle trailer. The present invention has wide application with respect to the type and kind of road vehicle to which it may be adapted and the following is only one of the specific embodiments in which it may be illustrated. It will be noted that the present invention has been shown in conjunction with a tractor-trailer unit commonly utilized in the motor transport field.

An object of the invention is to provide an auxiliary or secondary trailer for connection to the rear end of a motor vehicle trailer whereby a greater length of material may be carried.

Another object of the invention is to provide a secondary trailer for connection to a primary trailer with connection means which permit relative movement to the trailers in a vertical direction or in other words relative movement from a horizontal plane but prohibits relative turning movement between the two or from a vertical plane of alignment.

Another object of the invention is to provide a tractor-trailer unit with an auxiliary trailer which will stay in alignment with the tractor-trailer unit and may be easily backed into a desired position.

Another object of the invention is to provide a tractor-trailer unit having an auxiliary trailer with a support or load carrying structure wherein articles may be transported which are the combined length of the tractor-trailer unit and the auxiliary trailer.

Another object of the invention is to provide a tractor-trailer unit having an auxiliary trailer with a load carrying structure which may be utilized to carry long articles or smaller bulkier items between the structures.

Another object of the invention is to provide a tractor-trailer unit with an auxiliary or secondary trailer wherein a longer overall length may be utilized which is in accord with present-day regulations.

Other objects and a fuller understanding of this invention may be had by referring to the following description and claims, taken in conjunction with the accompanying drawings, in which:

Figure 1:
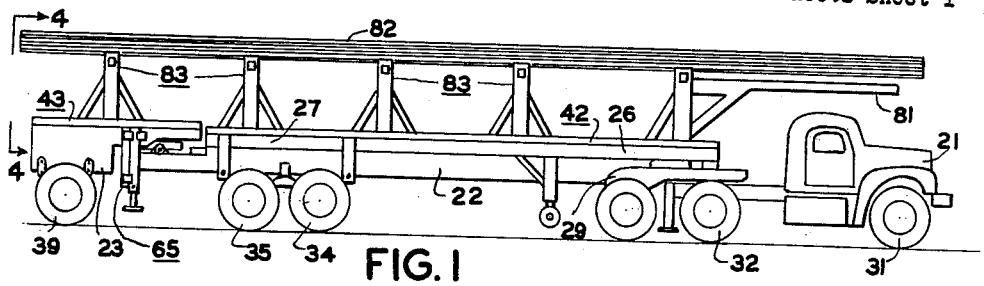
FIGURE 1 is a side elevational view of a road vehicle constructed under the teachings of the present invention.

The teachings of the present invention as discussed hereinabove are applicable to a wide variety of road vehicles, however, the specific illustrative embodiment has been shown as applied to a tractor-trailer unit, best seen in FIGURE 1. The tractor-trailer unit, shown in FIGURE 1, includes in combination a tractor 21, a primary or main trailer 22, and an auxiliary or secondary trailer 23. The primary trailer 22 has front and rear end portions 26 and 27, respectively, and the front end portion 26 of the primary trailer is connected to the tractor 21 by means of a supplementary wheel unit 29 which will not be described in detail in the present application. The tractor is provided with the usual front and rear wheels 31 and 32, respectively, and the primary trailer is provided with two sets of dual wheels 34 and 35, respectively, at the rear end portion thereof. The secondary trailer 23 also has front and rear end portions 37 and 38, respectively, and a set of dual wheels 39 located at the rear end portion thereof. The primary and auxiliary trailers 22 and 23 are also constructed to provide generally horizontally disposed bed surfaces 42 and 43, respectively.

Figure 3:
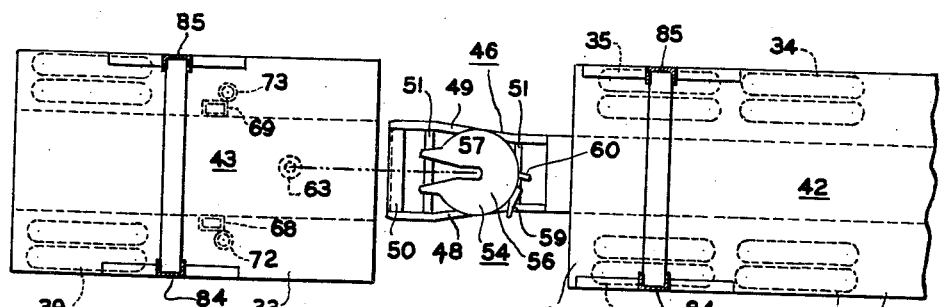
FIGURE 3 is an plan view of the structure shown in FIGURE 2.
Figure 2:
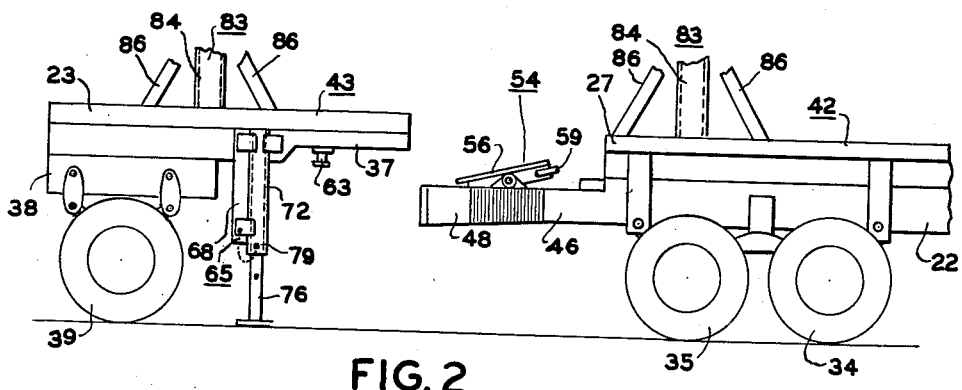
FIGURE 2 is an enlarged side elevational view of the left end of the road vehicle shown in FIGURE 1, but with the auxiliary trailer disconnected from the primary trailer.

A horizontally disposed extension 46 is fixedly secured to the rear end portion 27 of the primary trailer and extends generally axially rearwardly thereof. This extension includes first and second spaced channel members 48 and 49, respectively, which are secured together at their end portions by a transverse channel member 50. Two other lateral support members 51 are provided and extend between the spaced members 48 and 49, respectively, for further supporting the construction. Mounted on the extension 46 is a fifth wheel 54 of conventional construction and, as will be noted, the fifth wheel includes a plate member 56 with a rearwardly extending guide slot 57 (FIGURES 3 and 6) which diverges from the central portion of the plate member. The fifth wheel 54 also includes a manually operable lever 59 which controls a hook 60 which has only partially been shown in FIGURE 3. The function of the lever 59 and hook 60 is to secure a king pin which is adapted to reside in the central portion of the guide slot 57 to secure the primary and auxiliary trailers together. The plate member 56 of the fifth wheel assembly 54 is pivotally connected to the first and second spaced members 48 and 49 of the extension 46. This permits limited pivotal or rotative movement of the plate member relative to a horizontal plane.

Figure 6:
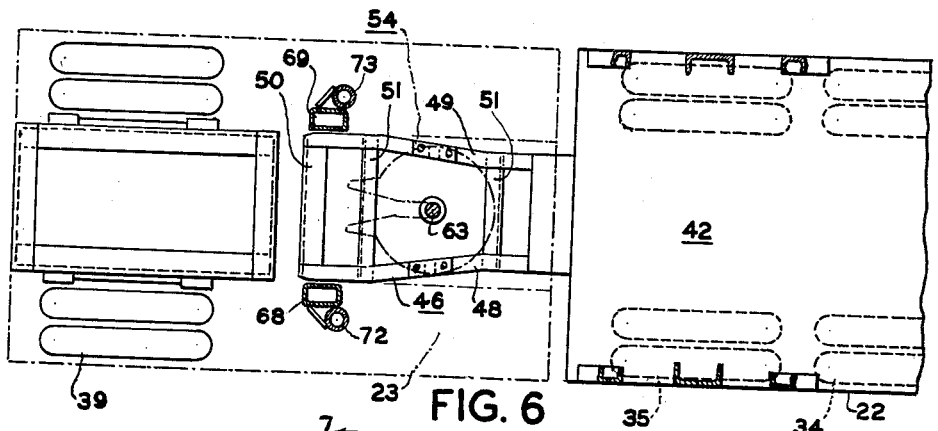
FIGURE 6 is a view taken generally along the line 6—6 of FIGURE 5.
Figure 5:
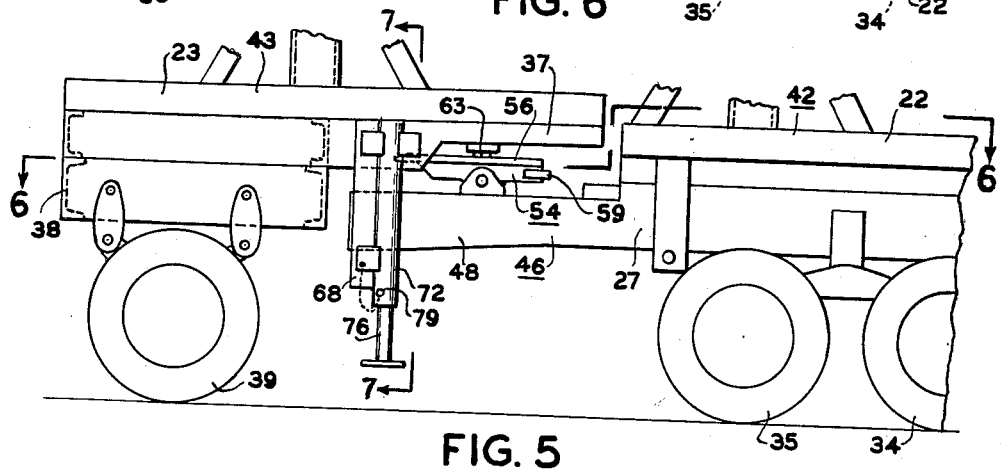
FIGURE 5 is a view similar to FIGURE 2, but showing the auxiliary trailer connected to the primary trailer.
Figure 7:
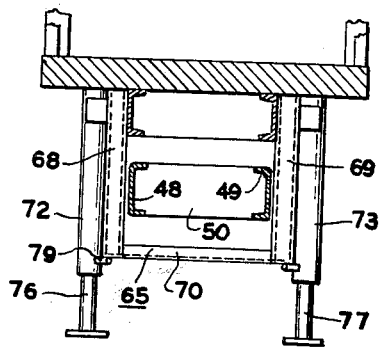
FIGURE 7 is a view taken generally along the line 7—7 of FIGURE 5, but showing only that portion of the auxiliary trailer adjacent the section line and showing nothing beyond.

A king pin 63 is fixedly secured to the front end portion 37 of the auxiliary trailer 23 underneath the structure which forms the bed of the trailer. This king pin, as mentioned hereinabove, attaches to the fifth wheel assembly 54 and secures the primary and auxiliary trailers together. This connection is best shown in FIGURES 5 and 6 of the drawings. An alignment framework 65 is provided on the auxiliary trailer between the king pin and the rear end portion thereof and this alignment framework includes first and second spaced vertical beams 68 and 69, respectively, joined at their lower end portions by a transverse beam 70. The first and second vertical beams 68 and 69 are spaced apart a distance slightly greater than the distance between the first and second spaced members 48 and 49, respectively, of the extension 46 on the primary trailer. The reason for this is that in connected position, the extension 46 resides in the framework 65 (FIGURES 5, 6 and 7) thereby preventing turning movement between the primary and auxiliary trailers, or in other words, preventing movement of the auxiliary trailer from a vertical plane relative to the primary trailer. A means has been provided for maintaining the auixliary trailer in an upright position when not connected to the primary trailer and this means includes first and second tubular members 72 and 73 which telescopically receive first and second standard members 76 and 77. The standard members and tubular members are retained in a preselected position relative to each other by means of apertures which extend through these members and pins 79 which extend through these apertures to hold the standard and tubular members in the preselected position.

The primary trailer at the front end portion thereof is provided with a framework 81 which extends outwardly over the tractor 21 and provides protection for the tractor from material which is being carried over the framework. The primary and auxiliary trailers are provided with a plurality of longitudinally spaced vertically extending support structures 83 each of which includes first and second spaced channels 84 and 85, respectively, supported by angular support members 86. The channels 84 and 85 serve to support and house the end portions of wood planks 87 (FIGURE 4) which are built up to determine the vertical height of the support.

Figure 4:
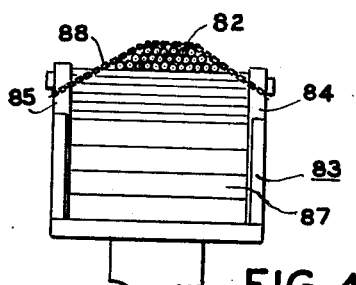
FIGURE 4 is a view taken generally along the line 4—4 of FIGURE 1.

FIGURES 1 and 4 show the tractor-trailer unit of the present invention as carrying rods 82 secured by chains 88 which are of a length which equals the combined length of the tractor, primary trailer, and auxiliary trailer. It will therefore be sen that under the teachings of the present invention that a secondary or auxiliary trailer has been provided which may be utilized with a conventional tractor-trailer construction so that a greater length of material may be transported than heretofore. The present teachings also provide a means for connecting the secondary or auxiliary trailer to a primary trailer which permits relative vertical movement between the two trailers, but which prohibits turning movement therebetween. This insures that an operator of the road vehicle may easily back and otherwise maneuver the unit into any desired position. The use of the combined primary and auxiliary trailers along with the vertical extending support structures on the beds of each of the trailers permits the transportation of articles which are of a length which equals the combined length of the tractor and primary and auxiliary trailers. If it is not desired to transport articles of great length, the herein described structure may also be utilized for carrying similar bulkier articles between the plurality of support structures 83. This particular construction also insures that various regulations may be complied with which only permit a predetermined maximum length when there is a single trailer but which permits a longer length when more than one trailer is utilized.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention as hereinafter claimed.

What is claimed is:

1. A tractor-trailer including in combination a primary trailer having front and rear end portions, a tractor, means connecting said tractor to said front end portion of said primary trailer, a horizontally disposed extension secured to said rear end portion of said primary trailer and extending rearwardly thereof, said extension including first and second spaced channel members secured together at their end portions by a transverse channel member, a fifth wheel mounted on said extension for rotation about an axis generally normal to the extent of said primary trailer and parallel to said transverse channel member, a secondary trailer having front and rear end portions, a king pin on said front end portion of said secondary trailer, an alignment framework carried by said secondary trailer between said rear end portion thereof and said king pin for preventing turning of said secondary trailer relative to said primary trailer, said alignment framework including first and second spaced vertical beams joined at their lower end portions by a transverse beam, said first and second beams being spaced apart a slightly greater distance than said first and second spaced channel members of said extension, said king pin of said secondary trailer and said fifth wheel of said primary trailer connecting the two trailers together with said first and second spaced channel members of said extension members of said extension member residing inside said first and second spaced vertical beams of said alignment framework thereby permitting relative vertical movement between said two trailers and preventing turning movement therebetween, said front end portion of said primary trailer having a framework which extends outwardly over said tractor, said primary and secondary trailer having a plurality of longitudinally spaced vertically extending support structures extending higher than said tractor whereby material may be transported which is of a length as great as the combined length of said tractor and primary and secondary trailers.

2. A trailer assembly for use with a tractor-primary trailer unit which primary trailer has front and rear end portions including in combination a horizontally disposed extension secured to said rear end portion of said primary trailer and extending rearwardly thereof, said extension including first and second spaced channel members secured together at their end portions by a transverse channel member, a fifth wheel mounted on said extension, a secondary trailer having front and rear end portions, a king pin on said front end portion of said secondary trailer, an alignment framework carried by said secondary trailer between said rear end portion thereof and said king pin for preventing turning of said secondary trailer relative to said primary trailer, said alignment framework including first and second spaced vertical beams joined at their lower end portions by a transverse beam, said first and second beams being spaced apart a slightly greater distance than said first and second spaced channel members of said extension, said king pin of said secondary trailer and said fifth wheel of said primary trailer connecting the two trailers together with said first and second spaced channel members of said extension member residing inside said first and second spaced vertical beams of said alignment framework thereby permitting vertical movement between said two trailers and preventing turning movement therebetween, said primary and secondary trailer having a plurality of longitudinally spaced vertically extending support structures extending higher than said tractor whereby material may be transported which is of a length as great as the combined length of said tractor and primary and secondary trailers.

References Cited in the file of this patent

UNITED STATES PATENTS

| | | |
|---|---|---|
| 1,880,123 | Davis et al. | Sept. 27, 1932 |
| 2,252,135 | Oyler | Aug. 12, 1941 |
| 2,271,808 | Starkey | Feb. 3, 1942 |
| 2,333,853 | Fellabaum | Nov. 9, 1943 |
| 2,697,614 | Smith | Dec. 21, 1954 |

FOREIGN PATENTS

| | | |
|---|---|---|
| 249,273 | Switzerland | Mar. 16, 1948 |